UNITED STATES PATENT OFFICE.

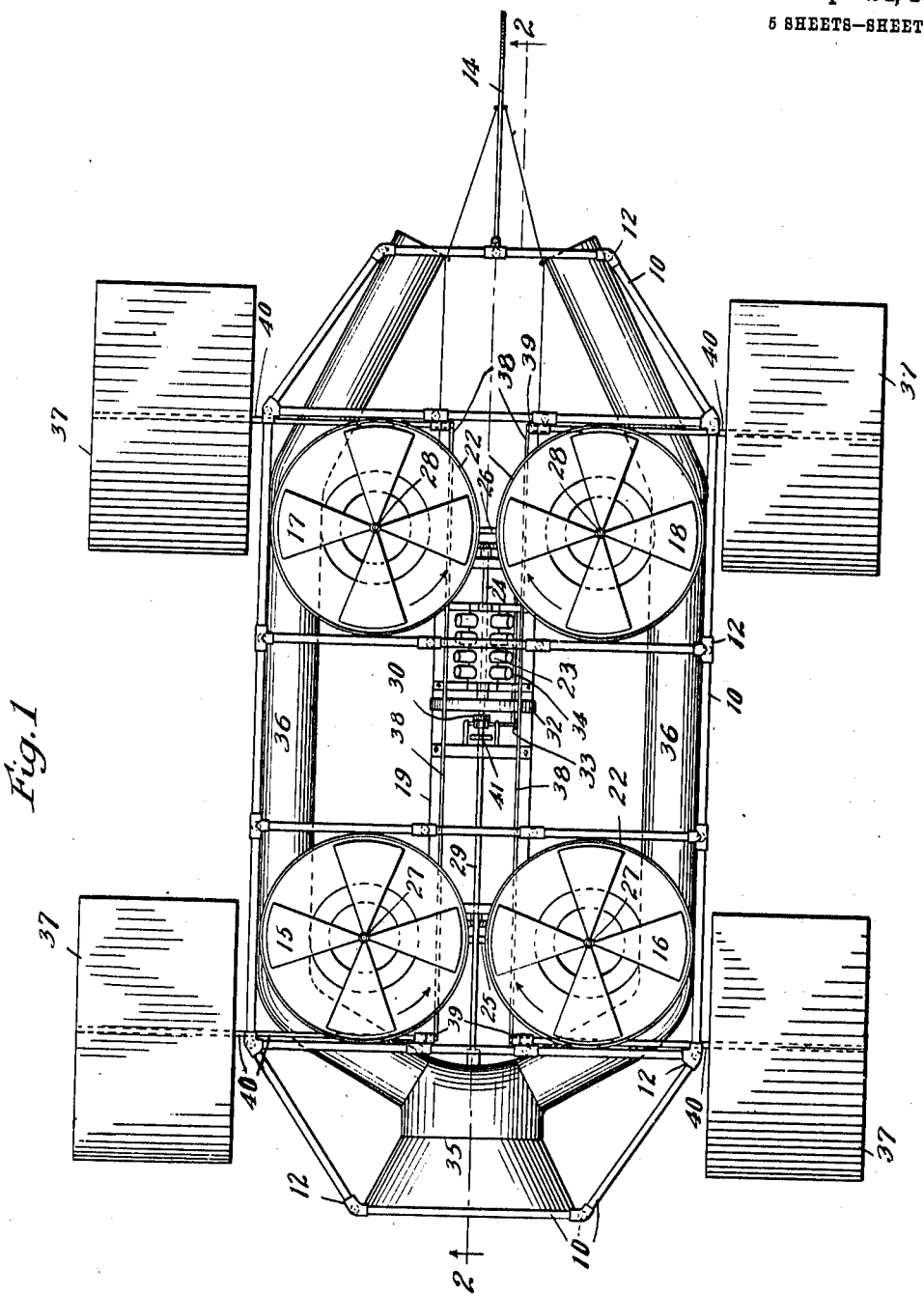

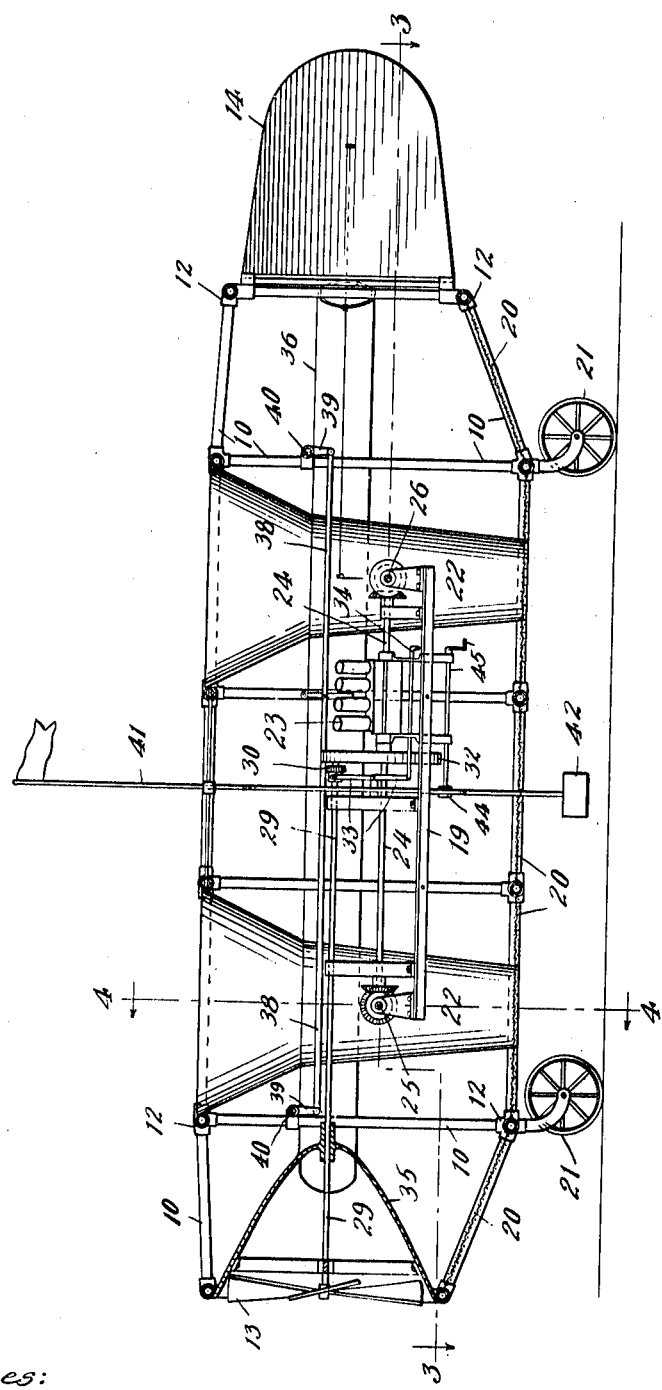

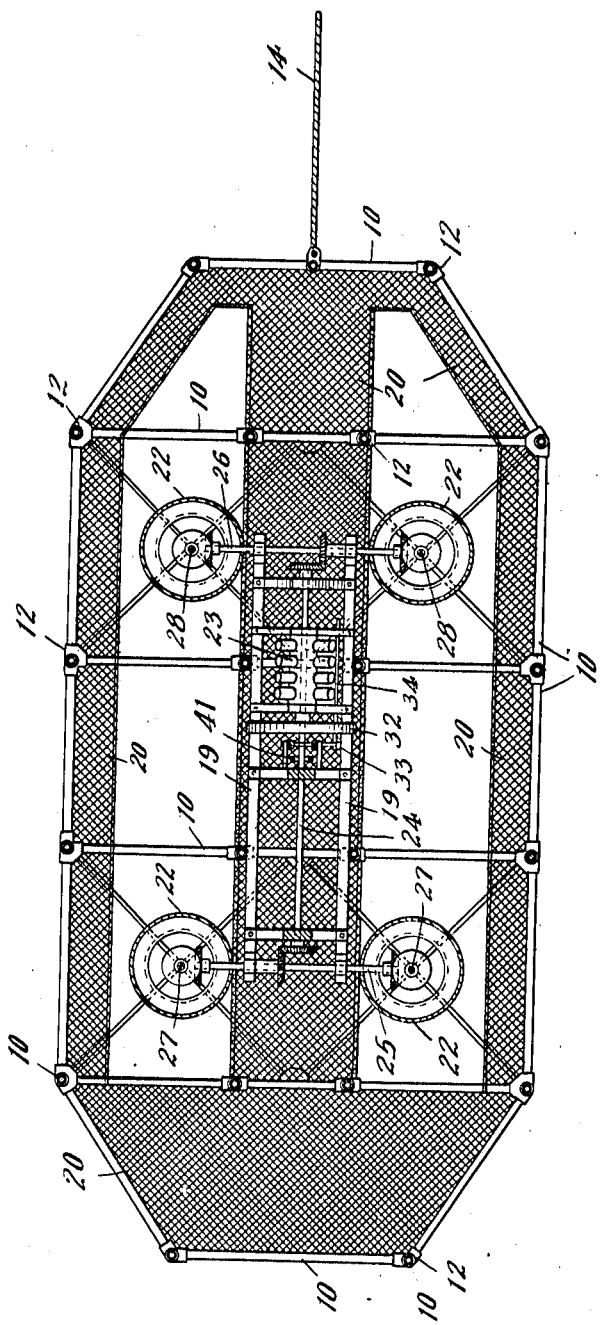

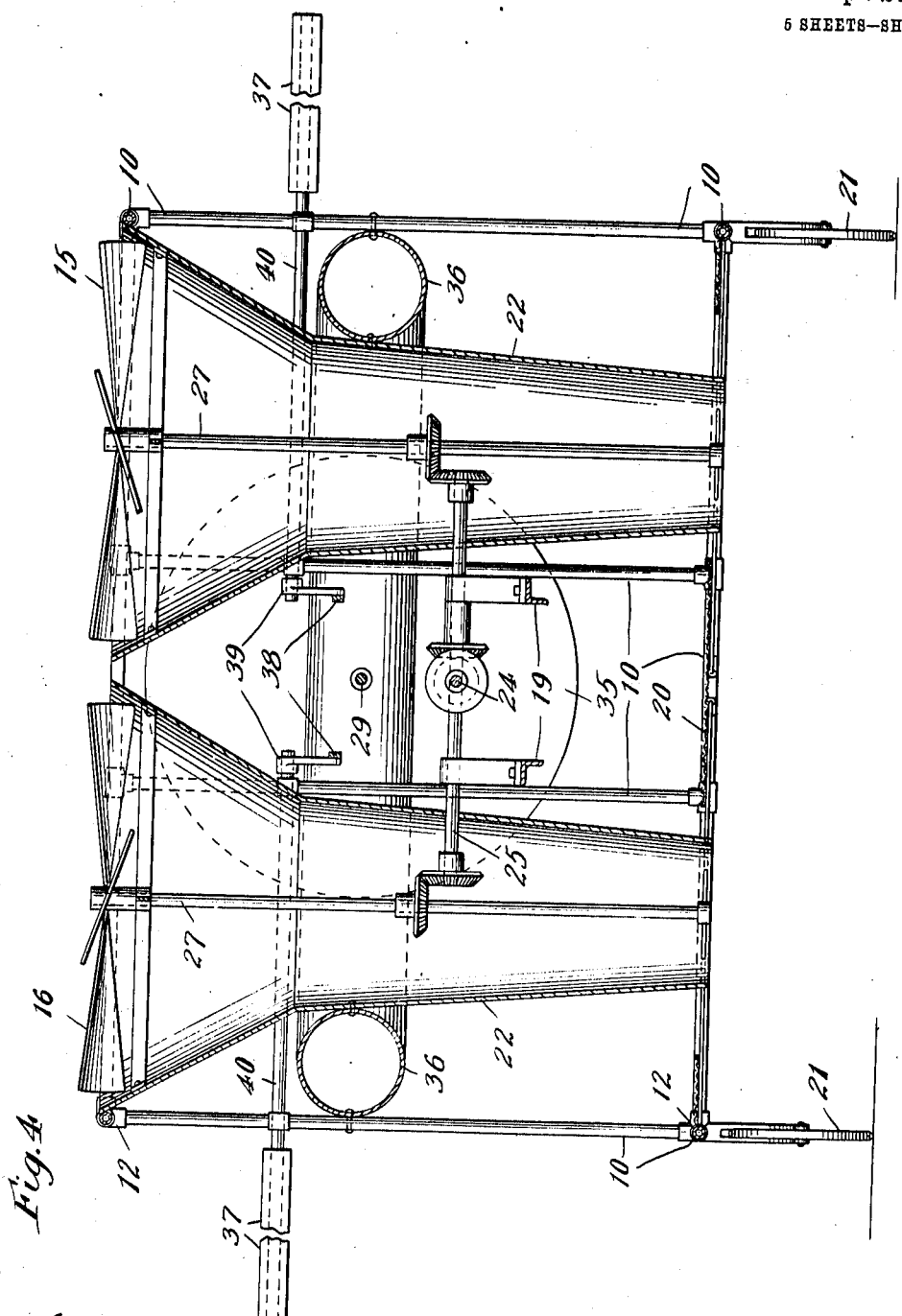

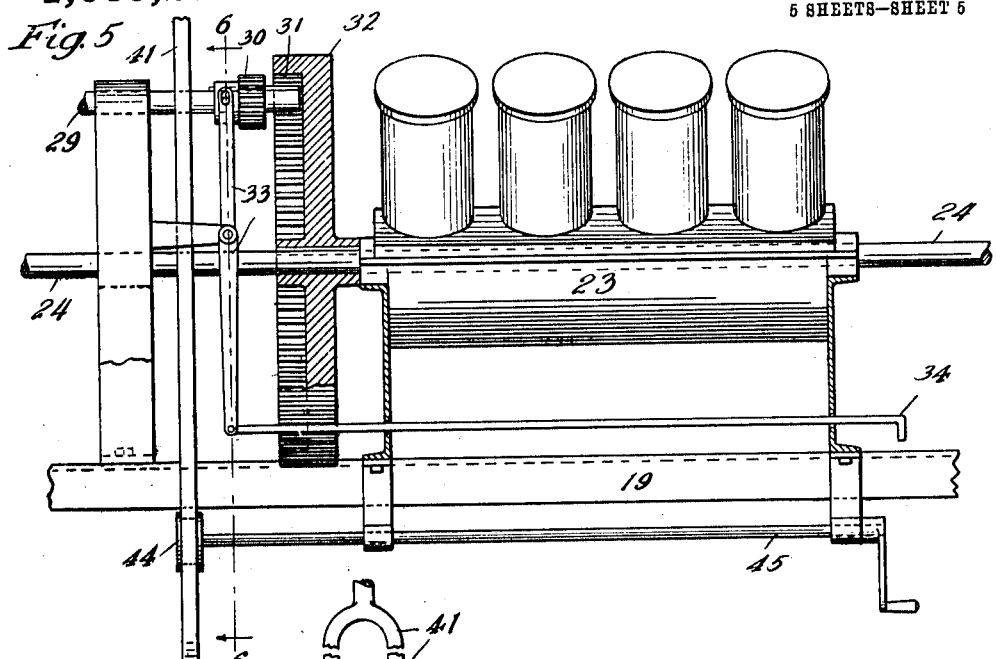
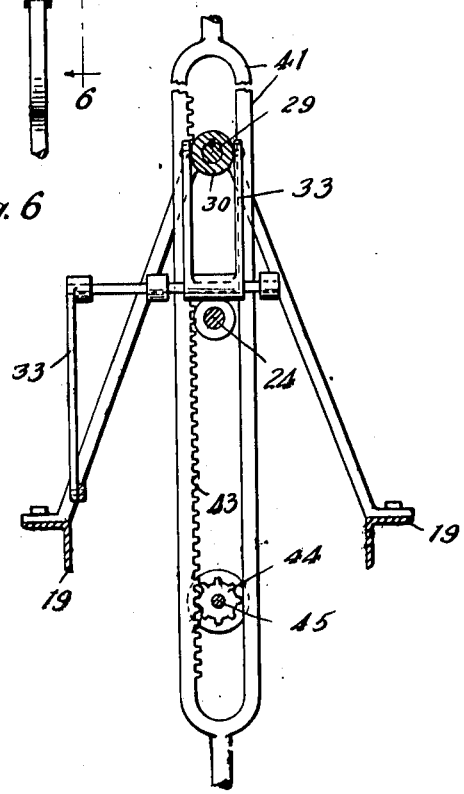

BRUNO ZOBEL, OF CHICAGO, ILLINOIS.

AEROMOTOR.

1,039,240.
Specification of Letters Patent.
Patented Sept. 24, 1912.

Application filed June 15, 1908. Serial No. 438,481.

*To all whom it may concern:*

Be it known that I, BRUNO ZOBEL, a citizen of the United States, residing in Chicago, in the county of Cook and State of Illinois, have invented a new and useful Improvement in Aeromotors, of which the following is a specification.

My invention relates to dirigible machines for aerial locomotion that do not have a gas receptacle or vacuum chamber to effect their levitation; and it has for an object the production of such a machine that may lift and maintain itself in the air without reliance upon outspread aeroplanes and a forward speed increment; and the invention has for further objects such other improvements in structure or function as may be found to obtain in the device as hereinafter described or claimed.

In the accompanying drawings, forming part of this specification, Figure 1 is a top plan view of the entire aeromotor; Fig. 2 is a section on the line 2—2 of Fig. 1; Fig. 3 is a section on the line 3—3 of Fig. 2; Fig. 4 is a section on the line 4—4 of Fig. 2; Fig. 5 is a fragmentary side elevation and partially sectional view of the motor and its clutch connection with the horizontal forward propeller-shaft, and of the adjustment of the vertical shaft from which the counterweight shown in Fig. 2 depends; and Fig. 6 is a section on the line 6—6 of Fig. 5.

Like reference numerals indicate like parts in all of the figures.

The light stiff framework of the machine is preferably composed of short lengths of whole bamboo, 10, joined together by socket connections, 12, of aluminum, and is constructed in five transverse sections, whereof the three middle sections form the quadrilateral center-body of the machine and the front and rear sections are of truncated sub-conical form and respectively support the forward propeller 13 and the rudder 14.
The four corners of the center-body of the framework sustain the four axially upright lifting propellers 15, 16, 17 and 18; and the central part of this center body of the framework contains the sub-framework 19, of angle steel, that supports the motor and driving shafts. A lattice-work flooring of split-bamboo, 20, is provided at the bottom of the framework to enable the operator to reach all parts of the mechanism, and is also extended over the upwardly sloping base of the front section of the framework to form an aeroplane surface that may assist in sustaining the weight of the forward propeller that is located in said front section.
The corners of the bottom of the center-body of the framework are provided with pivotally mounted cycle-wheels 21, 21, to support the machine when resting on, and permit its movement upon, the ground.

The four axially upright propellers have the function of lifting and maintaining the machine in the air and are therefore in constant rotation; and all rotate frontward and inward, to preserve the equipoise of the machine and yet not impede its forward movement. Each is provided with an exhaust funnel, 22, extending down through the framework and formed either of very light sheet metal or of fabric stretched over a funnel-formed frame. These funnels serve to protect the operators from the great exhaust pressure of the large propellers and to direct said exhaust directly downward, through and below the framework of the machine, so as to obtain the maximum lifting efficiency of the propeller-action. This permits the use of lifting propellers of maximum diameter in proportion to the top area of the framework of the machine, and of maximum power in proportion to the motor used. The motor, 23, is preferably of an extremely light, powerful and high-speed type such as the eight-cylinder "Antoinette," of French construction; and the motor-shaft 24 is miter-geared directly, at its either end, to, respectively, the front cross-shaft 25 and the rear cross-shaft 26, which cross-shafts are respectively miter-geared to the front pair, 27, and the rear pair, 28, of axially upright propeller-shafts.

The forward movement of the machine is effected independently of the above-described lifting means, and results from the action of the optionally operable forward propeller 13, having an axially horizontal position. The shaft 29 of this propeller extends back toward the motor and is provided at its inner end with a clutch-pinion, 30, adapted to engage the internal gear 31 on the motor-shaft fly-wheel 32, said pinion being thrown into and out of such meshing engagement by means of the lever 33 swung by the hand-rod 34. The aforesaid forward propeller is surrounded by an exhaust funnel 35 that forks into a pair of laterally disposed exhaust conduits 36, 36 that lead back to the rear of the framework of the machine and have their discharge ends converged toward the rudder that is swung midway between said ends, so that as said rudder is shifted to one side or the other it is presented more directly to the exhaust current issuing from one or the other of said discharge ends. Lateral steering is thereby accomplished in a highly effective and positive manner. These exhaust currents directed rearward and toward either side of the vertical plane of the rudder also aid in preserving the equipoise of the machine.

On either side of the framework of the machine there are mounted a pair of aeroplanes, 37, pivotally movable to various inclinations from the horizontal or the vertical, the planes on each side respectively being movable in unison by reason of the connection member 38 joining the inner crank ends 39 of their pivot shafts 40. By shifting the pair on either side to any desired angle, the flight of the machine may be variously controlled, upward or downward or to either side, in response to the varying resistances offered by the different inclinations of the planes in respect to the direction of the air currents or the direction of propulsive impulse given by the propellers. To further aid in preserving the equipoise of the machine under varying conditions, the framework is centrally provided with a vertically adjustable shaft 41 from whose lower end there depends a counterweight 42. The rack 43, engaged by the pinion 44 on the hand-crank rod 45, permits this counterweight to be let down a considerable distance below the bottom of the framework to right the machine when any conditions produce a tendency to unstable balance.

My invention is hereinabove set forth as embodied in one particular form of construction, but I do not limit it thereto or to less than all the possible forms in which said invention, as hereinafter claimed, may be embodied and distinguished from prior devices for like purposes.

I claim:—

1. In a mechanically levitated aeromotor, in combination, a body-framework sustaining a propeller-motor, axially upright lifting propellers disposed in pairs forward and aft and on either side of the fore-and-aft center-line and all rotating frontward and inward, said propellers being mutually separated by sheathing supported around the zones of the sweep of their blades, an axially horizontal propeller, and steering means, substantially as specified.

2. In a mechanically levitated aeromotor, in combination, a body-framework sustaining a propeller-motor, axially upright lifting propellers disposed in pairs forward and aft and on either side of the fore-and-aft center-line and all rotating frontward and inward, an axially horizontal propeller located forward, an exhaust conduit leading rearward from said propeller, and steering means, substantially as specified.

3. In a mechanically levitated aeromotor, in combination, a body-framework sustaining a propeller-motor, axially upright lifting propellers disposed in pairs forward and aft and on either side the fore-and-aft center-line and all rotating frontward and inward, an axially horizontal propeller located forward, a pair of laterally disposed exhaust conduits leading rearward from said propeller, and steering means, substantially as specified.

4. In a mechanically levitated aeromotor, in combination, a body-framework sustaining a propeller-motor, axially upright lifting propellers disposed in pairs forward and aft and on either side of the fore-and-aft center-line and all rotating frontward and inward, an axially horizontal propeller located forward, a pair of laterally disposed exhaust conduits leading rearward from said propeller, and a rudder swung between the discharge ends of said conduits, substantially as specified.

5. In a mechanically levitated aeromotor, in combination, a body-framework sustaining a propeller-motor, axially upright lifting propellers disposed in pairs forward and aft and on either side the fore-and-aft center-line and all rotating frontward and inward, an axially horizontal propeller located forward, a pair of laterally disposed exhaust conduits leading rearward from said propeller and having their discharge ends converging toward the rudder, and a rudder swung between the discharge ends of said conduits, substantially as specified.

6. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller, and steering means, substantially as specified.

7. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, an exhaust conduit leading rearward from said propeller, and steering means, substantially as specified.

8. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller, and steering means, substantially as specified.

9. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller, and a rudder swung between the discharge ends of said conduits, substantially as specified.

10. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller and having their discharge ends converging toward the rudder, and a rudder swung between the discharge ends of said conduits, substantially as specified.

11. In a mechanically levitated aeromotor, in combination, a body-framework sustaining a propeller-motor, axially upright lifting propellers disposed in pairs forward and aft and on either side of the fore-and-aft center-line and all rotating frontward and inward, said propellers being mutually separated by sheathing supported around the zones of the sweep of their blades, an axially horizontal propeller, movable lateral aeroplanes for controlling flight, and steering means, substantially as specified.

12. In a mechanically levitated aeromotor, in combination, a body-framework sustaining a propeller-motor, axially upright lifting propellers disposed in pairs forward and aft and on either side of the fore-and-aft center-line and all rotating frontward and inward, an axially horizontal propeller located forward, an exhaust conduit leading rearward from said propeller, movable lateral aeroplanes for controlling flight, and steering means, substantially as specified.

13. In a mechanically levitated aeromotor, in combination, a body-framework sustaining a propeller-motor, axially upright lifting propellers disposed in pairs forward and aft and on either side the fore-and-aft center-line and all rotating frontward and inward, an axially horizontal propeller located forward, a pair of laterally disposed exhaust conduits leading rearward from said propeller, movable lateral aeroplanes for controlling flight, and steering means, substantially as specified.

14. In a mechanically levitated aerometer, in combination, a body-framework sustaining a propeller-motor, axially upright lifting propellers disposed in pairs forward and aft and on either side of the fore-and-aft center-line and all rotating frontward and inward, a pair of laterally disposed exhaust conduits leading rearward from said propeller, movable lateral aeroplanes for controlling flight, and a rudder swung between the discharge ends of said conduits, substantially as specified.

15. In a mechanically levitated aeromotor, in combination a body-framework sustaining a propeller-motor, axially upright lifting propellers disposed in pairs forward and aft and on either side the fore-and-aft center-line and all rotating frontward and inward, an axially horizontal propeller located forward, a pair of laterally disposed exhaust conduits leading rearward from said propeller and having their discharge ends converging toward the rudder, movable lateral aeroplanes for controlling flight, and a rudder swung between the discharge ends of said conduits, substantially as specified.

16. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller, movable lateral aeroplanes for controlling flight, and steering means, substantially as specified.

17. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, an exhaust conduit leading rearward from said propeller, movable lateral aeroplanes, and steering means, substantially as specified.

18. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller, movable lateral aeroplanes for controlling flight, and steering means, substantially as specified.

19. In a mechanically levitated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller, movable lateral aeroplanes for controlling flight, and a rudder swung between the discharge ends of said conduits, substantially as specified.

20. In a mechanically leviated aeromotor, in combination, a body-framework sustaining a propeller-motor, axially upright lifting propellers disposed in pairs forward and aft and on either side the fore-and-aft center-line and all rotating frontward and inward, exhaust funnels extending downward from said lifting propellers, an axially horizontal propeller located forward, a pair of laterally disposed exhaust conduits leading rearward from said propeller and having their discharge ends converging toward the rudder, movable lateral aeroplanes for controlling flight, and a rudder swung between the discharge ends of said conduits, substantially as specified.

In testimony whereof, I have hereunto set my hand.

BRUNO ZOBEL.

Witnesses:
HENRY LOVE CLARKE,
H. M. MUNDAY.